(12) United States Patent
Kautz et al.

(10) Patent No.: US 6,241,109 B1
(45) Date of Patent: Jun. 5, 2001

(54) LOAD LOCK FOR RACK

(75) Inventors: Allen B. Kautz, Wheaton; Robert D. Gruber, New Lenox, both of IL (US)

(73) Assignee: Interlake Material Handling, Inc., Naperville, IL (US)

( * ) Notice: Subject to any disclaimer, the term of this patent is extended or adjusted under 35 U.S.C. 154(b) by 0 days.

(21) Appl. No.: 09/488,980

(22) Filed: Jan. 21, 2000

Related U.S. Application Data
(60) Provisional application No. 60/118,830, filed on Feb. 5, 1999.

(51) Int. Cl.[7] .................................................. A47F 5/00
(52) U.S. Cl. ...................... 211/192; 248/222.11; 403/329; 403/254
(58) Field of Search .................................. 211/192, 191; 248/222.11; 403/316, 317, 319, 354, 329

(56) References Cited
U.S. PATENT DOCUMENTS

| | | |
|---|---|---|
| 3,042,221 | 7/1962 | Rasmussen . |
| 3,070,237 | 12/1962 | Fullerton et al. . |
| 3,273,720 | 9/1966 | Seiz . |
| 3,303,937 | 2/1967 | McConnell . |
| 3,346,126 | 10/1967 | Bloom et al. . |
| 3,351,212 | 11/1967 | McConnell . |
| 3,392,848 | 7/1968 | McConnell et al. . |
| 3,512,653 | 5/1970 | Erismann . |
| 3,545,626 | 12/1970 | Seiz . |
| 3,612,290 | 10/1971 | Evans . |
| 3,637,087 | 1/1972 | Denny . |
| 3,702,137 | 11/1972 | Evans . |
| 3,741,405 | 6/1973 | McConnell et al. . |
| 3,871,525 | 3/1975 | Al-Dabbagh et al. . |
| 3,905,712 | 9/1975 | McConnell . |
| 3,986,318 | 10/1976 | McConnell . |
| 4,030,612 | 6/1977 | Gray . |
| 4,074,812 | 2/1978 | Skubic et al. . |
| 4,131,204 | 12/1978 | Jacoby et al. . |
| 4,189,250 | 2/1980 | Abbott et al. . |
| 4,262,809 | 4/1981 | McConnell . |
| 4,423,817 | 1/1984 | Monjo-Rufi . |
| 4,425,049 | 1/1984 | Travis . |
| 4,729,484 | 3/1988 | McConnell . |
| 4,955,743 | 9/1990 | King . |
| 5,025,937 | 6/1991 | King . |
| 5,131,781 | 7/1992 | Klein . |
| 5,350,074 | 9/1994 | Rosenband . |
| 5,624,045 | 4/1997 | Highsmith et al. . |
| 5,653,349 | 8/1997 | Dana et al. . |
| 5,713,476 | 2/1998 | Highsmith et al. . |
| 5,791,502 | 8/1998 | Bietz et al. . |
| 5,938,367 | * 8/1999 | Olson ................................ 403/254 |

* cited by examiner

*Primary Examiner*—Robert W. Gibson, Jr.
(74) *Attorney, Agent, or Firm*—Camoriano and Assoicates; Theresa Fritz Camoriano

(57) ABSTRACT

A load lock for a rack includes a mounting clip mounted in a recess of the mounting bracket, which makes the lock easy to install and impossible to remove without dismantling the rack. The load lock also includes a locking pin having an enlarged head, and the bracket includes a recess for receiving the enlarged head, so the locking pin can be retracted to install and remove the beam, but the recess provides a stop to prevent the lock from being retracted far enough to damage the lock.

15 Claims, 16 Drawing Sheets

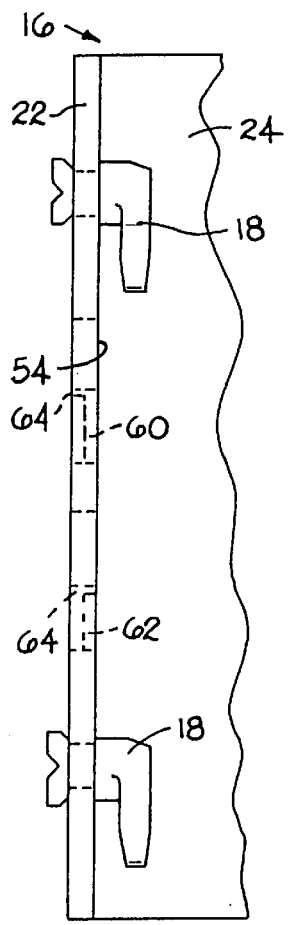
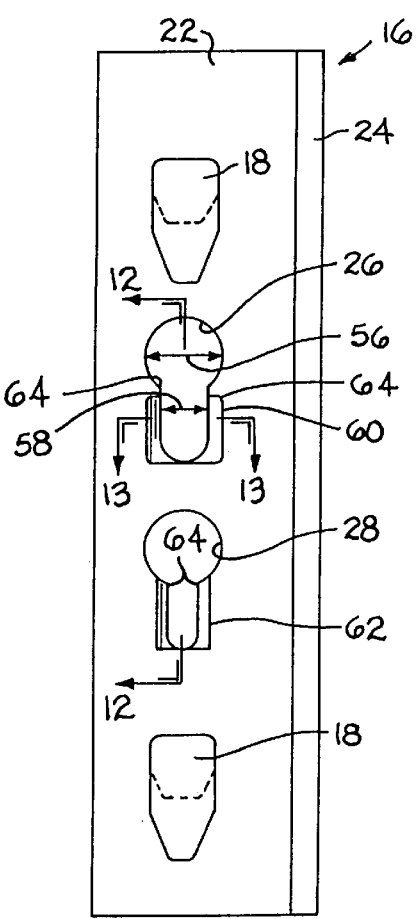
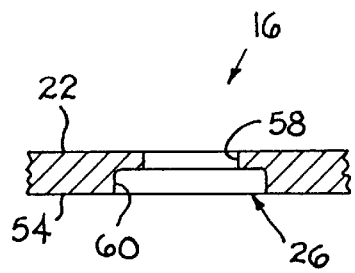
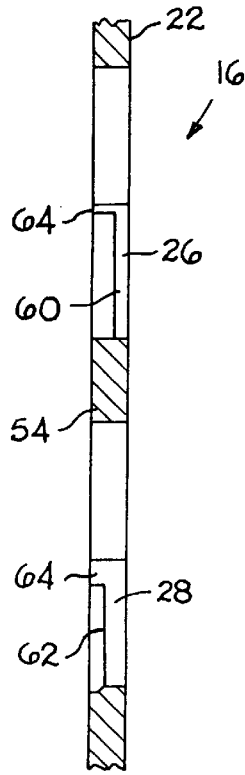
FIG. 10
FIG. 11
FIG. 13
FIG. 12

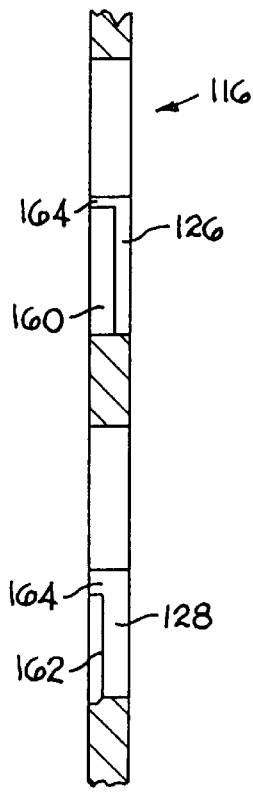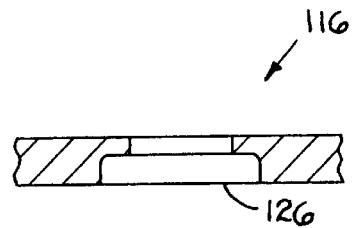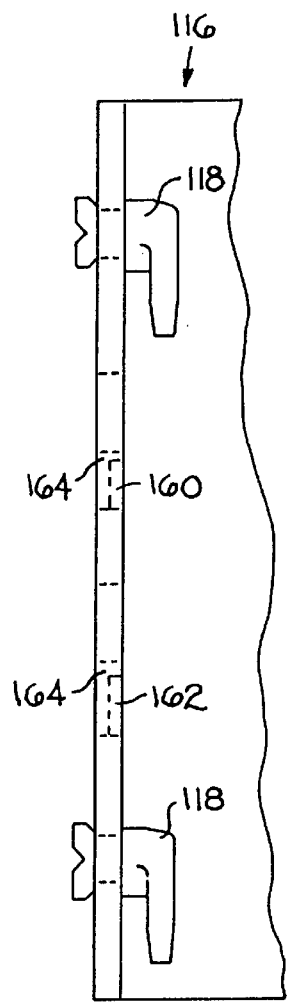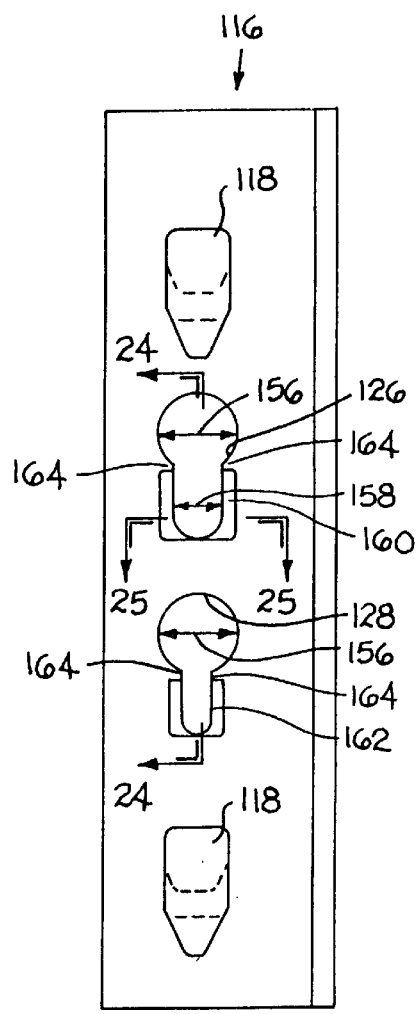
FIG. 24
FIG. 25
FIG. 22
FIG. 23

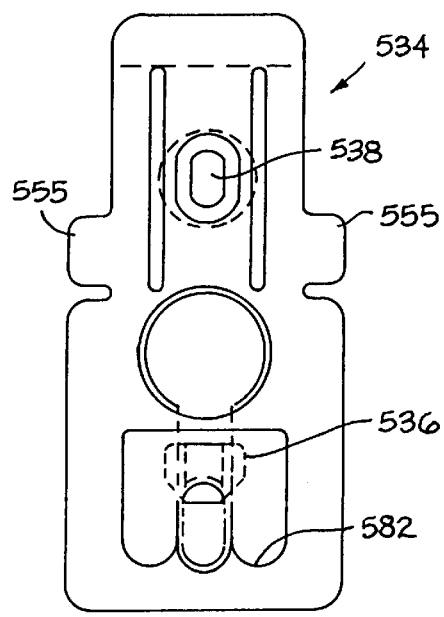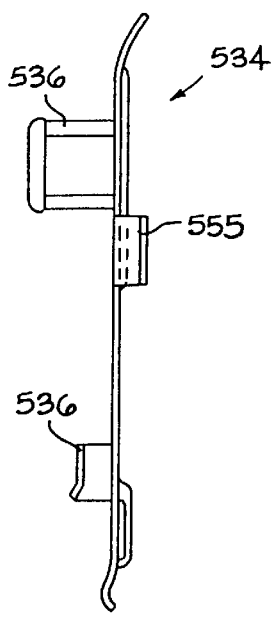
FIG. 41              FIG. 42
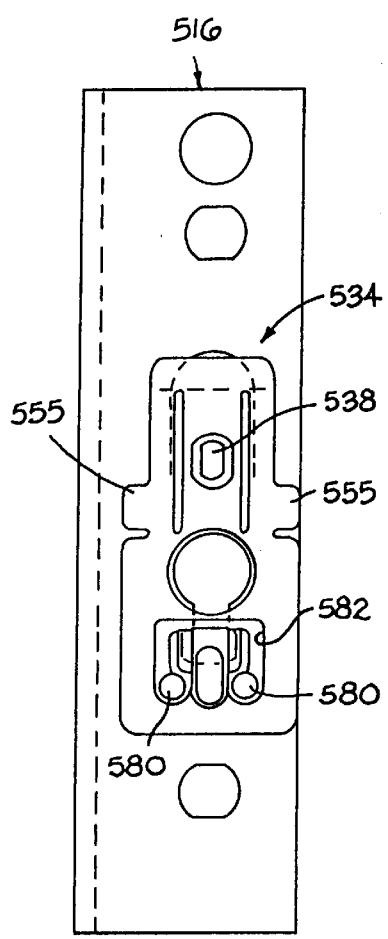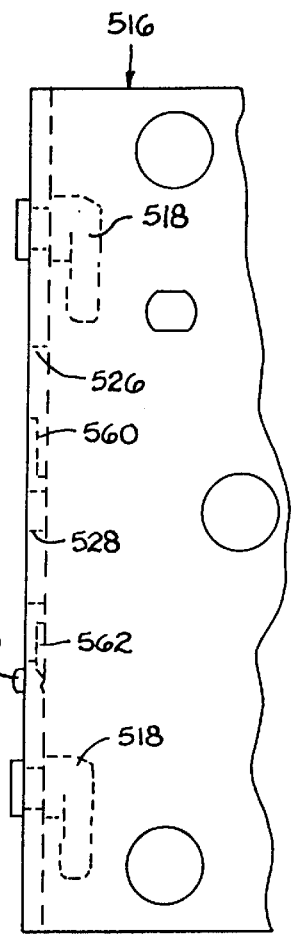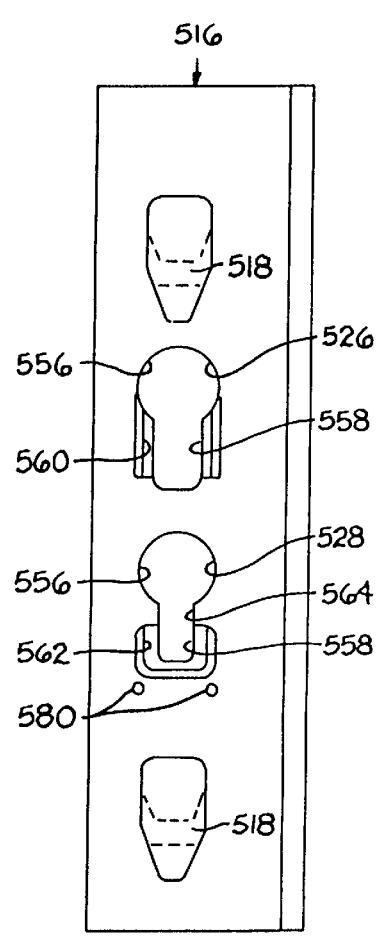
FIG. 43       FIG. 44       FIG. 45

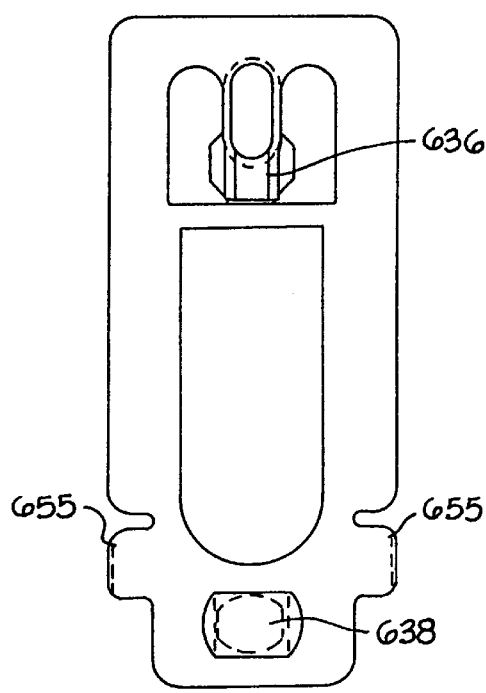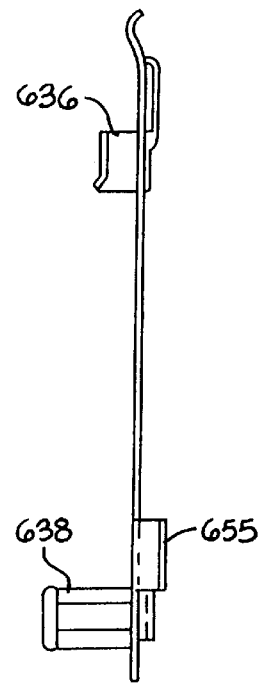
FIG. 46   FIG. 47
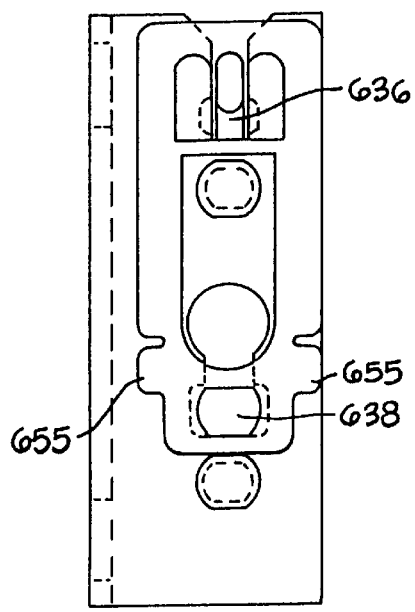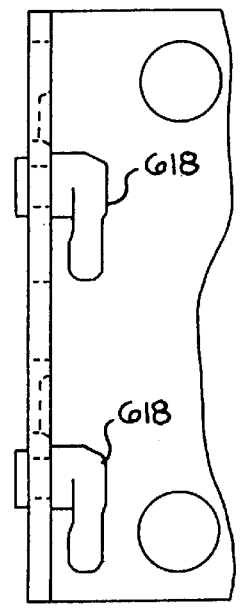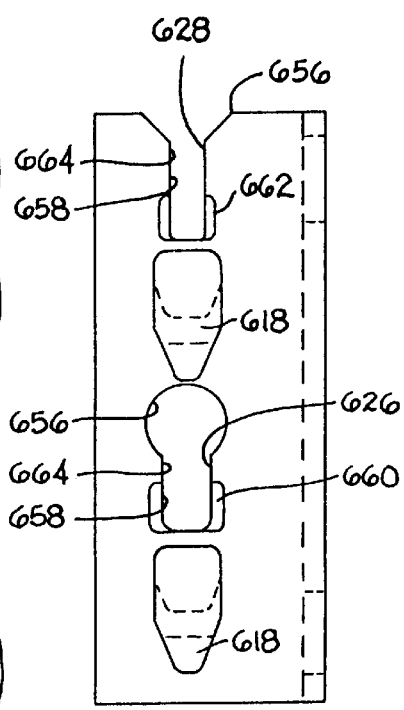
FIG. 48   FIG. 49   FIG. 50

LOAD LOCK FOR RACK

This application claims priority from U.S. Ser. No. 60/118,830, filed Feb. 5, 1999.

BACKGROUND OF THE INVENTION

Storage racks generally include a plurality of vertical members, which rest on the floor, and a plurality of horizontal beams mounted on the vertical members. The beams include a mounting bracket with lugs projecting inwardly and downwardly from the bracket. The lugs are received in holes of the vertical members to support the weight of the horizontal beams. Load locks are commonly used to prevent the horizontal beams from becoming accidentally dislodged from the vertical members. The load locks generally include a pin which extends through a hole in the bracket and a hole in the vertical member to prevent the horizontal beam from lifting up enough to dislodge the lugs. Some problems with prior art load locks are that they can come loose in shipment, they may themselves be too easy to dislodge, or they may be too difficult to install. Also, for resilient load locks which are retracted to pull the locking pin back, they may be retracted too far, which damages the resilient member.

SUMMARY OF THE INVENTION

The present invention provides a resilient load lock which is easy to install, which will not accidentally fall out, and which cannot be removed from the rack without disassembling the rack or destroying the lock. The present invention also provides an arrangement which prevents the resilient member from being pulled out too far, thereby protecting the load lock against damage during normal use.

BRIEF DESCRIPTION OF THE DRAWINGS

FIG. 10 is a broken-away end view of the bracket of FIGS. 1–5;

FIG. 11 is a side view of the bracket of FIG. 10;

FIG. 12 is a view taken along the section 12—12 of FIG. 11;

FIG. 13 is a view taken along the section 13—13 of FIG. 11;

FIG. 22 is an end view of an alternative bracket;

FIG. 23 is a side view of the bracket of FIG. 22;

FIG. 24 is a view taken along the section 24—24 of FIG. 23;

FIG. 25 is a view taken along the section 25—25 of FIG. 23;

FIG. 41 is a front view of another alternative embodiment of a locking member made in accordance with the present invention;

FIG. 42 is a side view of the locking member of FIG. 41;

FIG. 43 is a front view of the locking member of FIG. 41 mounted on an alternative bracket;

FIG. 44 is a side view of the bracket of FIG. 43;

FIG. 45 is a rear view of the bracket of FIG. 43;

FIG. 46 is a front view of another embodiment of a locking member made in accordance with the present invention;

FIG. 47 is a side view of the locking member of FIG. 46;

FIG. 48 is a front view of the locking member of FIG. 46 mounted on a bracket made in accordance with the present invention;

FIG. 49 is a side view of the bracket of FIG. 48; and

FIG. 50 is a rear view of the bracket of FIG. 49.

DESCRIPTION OF THE PREFERRED EMBODIMENTS

Figure 1:
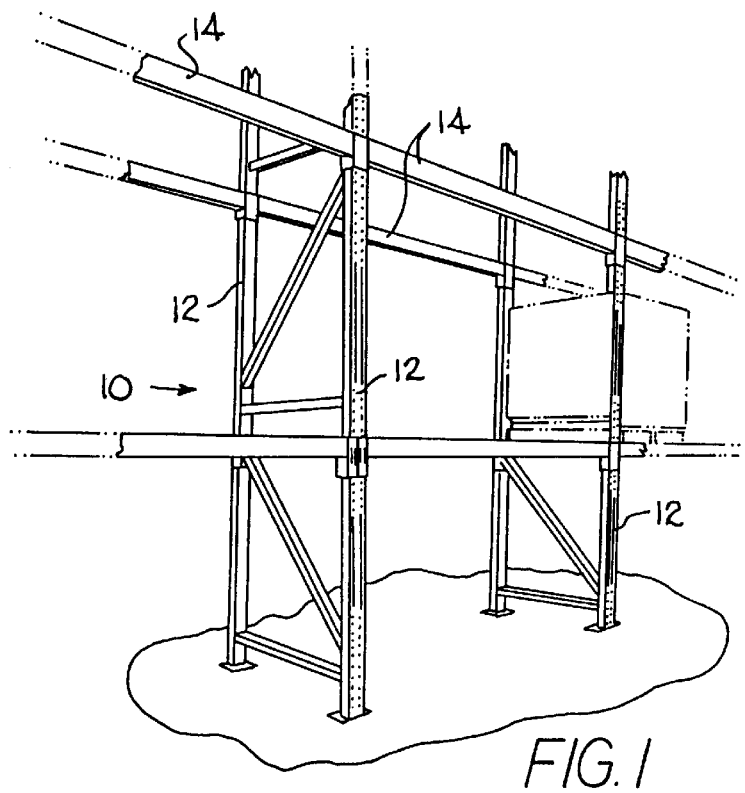
FIG. 1 is a perspective view of a storage rack made in accordance with the present invention.
Figure 2:
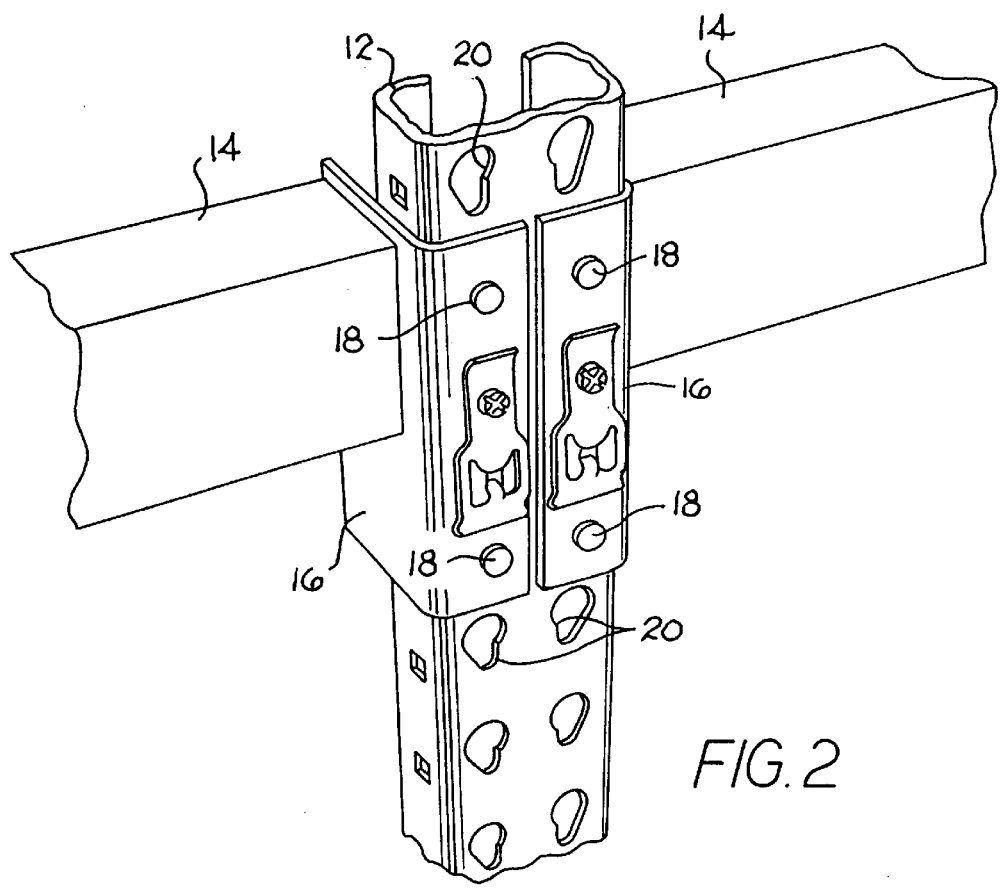
FIG. 2 shows an enlarged, broken-away portion of the rack of FIG. 1, where two horizontal beams are mounted on a vertical member of the rack.
Figure 3:
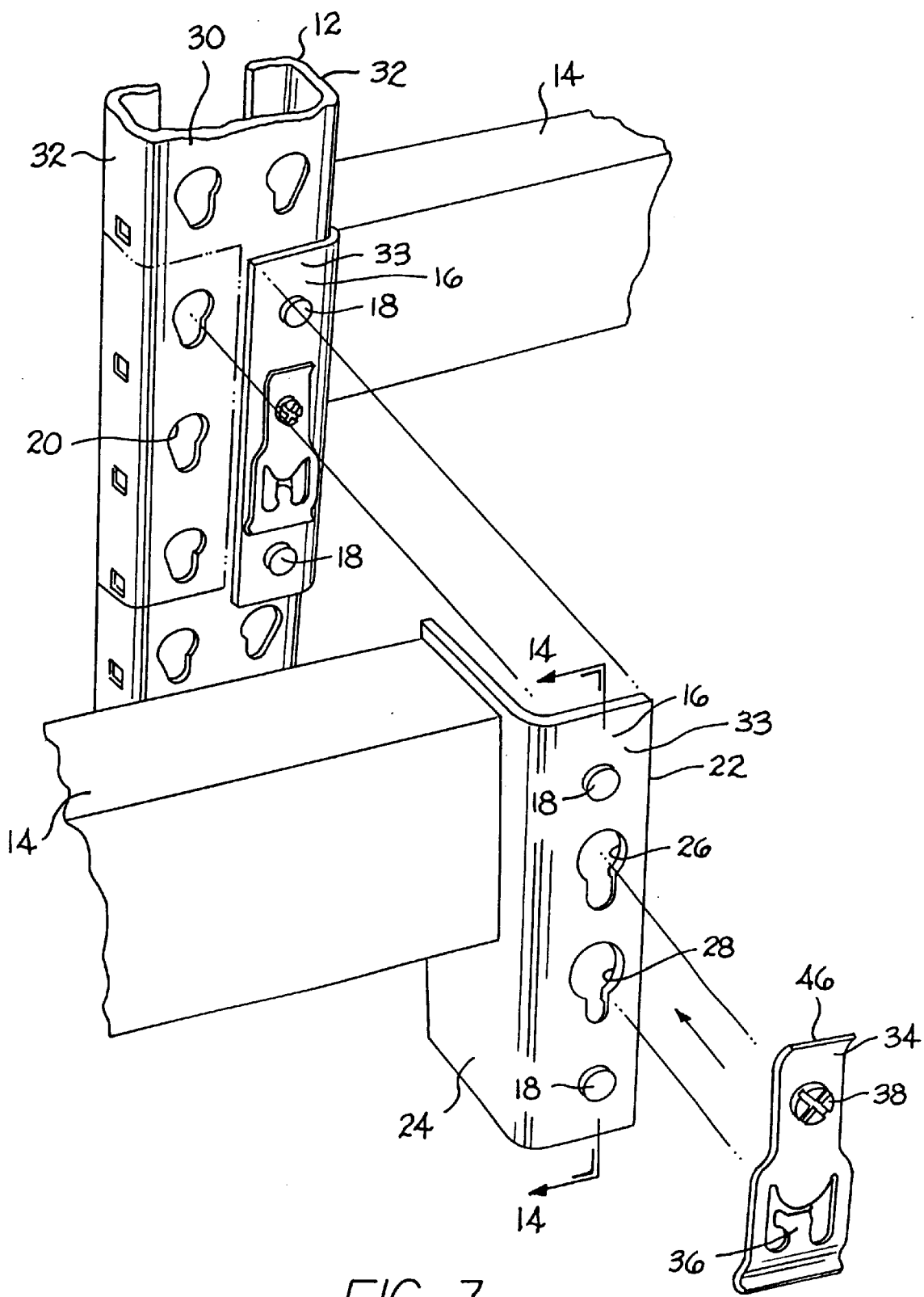
FIG. 3 is an exploded perspective view of the portion of the rack of FIG. 2.

FIGS. 1–17 show a first embodiment of a rack arrangement made in accordance with the present invention. FIG. 1 shows a storage rack 10, including vertical members 12 and horizontal beams 14 mounted on the vertical members 12. FIGS. 2–5 show a broken-away section of the vertical member 12 with two horizontal beams 14 mounted on the vertical member. Each beam 14 has a bracket 16 welded or otherwise secured to the end of the beam. The bracket 16 is an L-shaped member, and studs 18 on the bracket 16 project through holes 20 in the vertical member 12 to hold the beam 14 on the vertical member 12. While only one end of each beam 14 is shown, it is understood that the other end of each beam 14 is similarly mounted on the next adjacent vertical member 12 of the rack 10.

Each L-shaped bracket 16 defines two legs 22, 24. The first leg 22 carries the studs 18 and has at least first and second holes 26, 28 (See FIG. 3), which will be described in more detail below. The first leg 22 abuts the front face 30 of the vertical member 12, and the second leg 24 abuts one of the side faces 32 of the vertical member 12.

On the outer surface 33 of the first leg 22 of the bracket 16 is mounted a resilient locking member 34, which is mounted onto the bracket 16 by means of a clip 36 and which carries a locking pin 38 that extends through a first hole 26 in the bracket 16 and through a vertical member hole 20, which prevents the bracket 16 from moving up relative to the vertical member 12, thereby locking the horizontal beam 14 onto the column 12 of the rack 10.

More details of the locking arrangement are shown in FIGS. 6–17. FIGS. 6–9 show details of the resilient locking member 34. The main body of the locking member 34 is made of a resilient material, such as spring steel. In the upper portion is a locking pin 38, which preferably is staked to the main body by inserting the shank 40 of the locking pin 38 through a hole in the main body and deforming the shank 40 to rigidly secure the locking pin 38 on the resilient body. The locking pin 38 includes an enlarged width head 42 at the end of the narrower width shank 40. Two vertical reinforcing ridges 44 are stamped into the body on either side of the locking pin 38. The uppermost portion of the resilient body is curved backward to form a handle 46 for retracting the locking pin 38, as will be described later. In the lower portion of the locking member 34 is a cut-out area 48 into which projects the mounting clip 36, which also has a stamped ridge 50 for strength and which has left and right wings 52.

FIGS. 10–14 show details of the bracket 16. The first and second legs 22, 24 lie approximately at right angles to each other. The studs 18 are staked onto the first leg 22 in the same manner that the locking pin 38 is staked to the resilient body of the locking member 34, and the studs 18 project inwardly and downwardly from the inner surface 54 of the bracket 16. While two studs 18 are shown in this embodiment, it is understood that more studs could be used, and it is expected that, for taller brackets, there may be three or more studs 18 on a bracket. Also, the studs 18 could be of other known designs, such as studs with enlarged, rounded heads rather than downwardly-projecting heads as shown here. The head of the stud should be larger than the shank at least in one direction to prevent it from pulling straight out of the vertical member once it has been installed. The inner surface 54 of the bracket 16 is flat. The first and second holes 26, 28 each have a greater-width portion 56 and a narrower-width portion 58. The greater-width portion 56 of the first hole 26 is wide enough to permit the head 42 of the locking pin 38 to pass through, and the narrower-width portion 58 of the first hole 26 is wide enough to permit the shank 40 of the pin to pass through while not permitting the head 42 to pass through. In the second hole 28, the greater-width portion 56 is wide enough to permit the wings 52 of the clip 36 to pass through, while the narrower-width portion 58 is wide enough to permit the stem portion 53 of the clip to pass through but not the wings 52. The interior surface 54 of the bracket 16 defines a recess 60 (See FIG. 11 and FIG. 13) adjacent to the narrower-width portion 58 of the first hole 26, and it defines a recess 62 adjacent to the narrower-width portion 58 of the second hole 28. Each recess 60, 62 terminates short of its respective greater-width portion 56 leaving a non-recessed, narrower-width portion 64.

Figure 14:
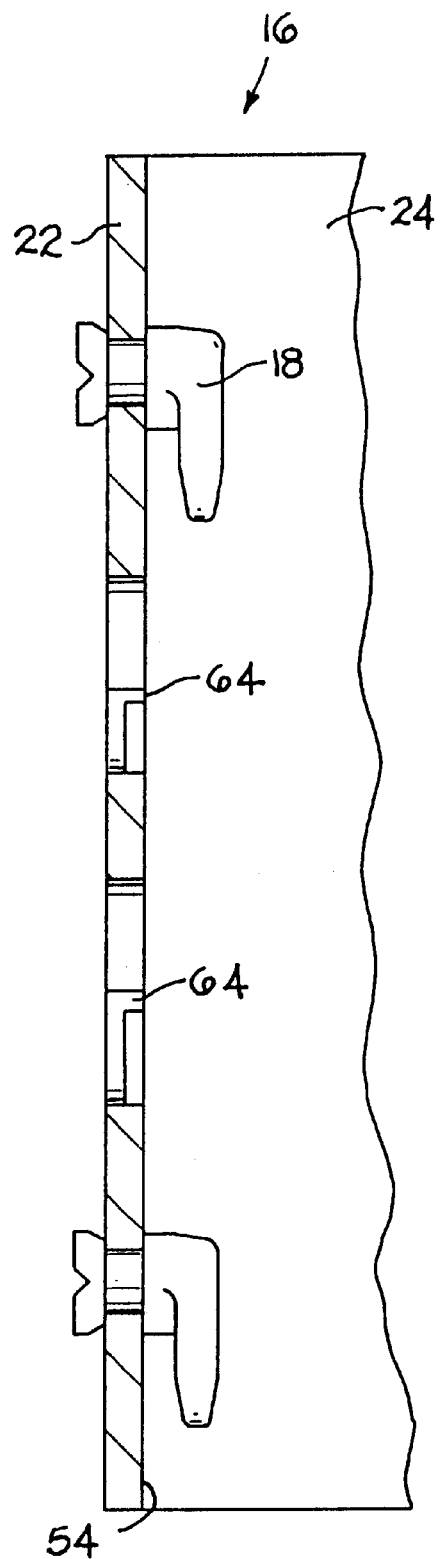
FIG. 14 is the same view as FIG. 10 but showing the bracket in section.
Figure 14A:
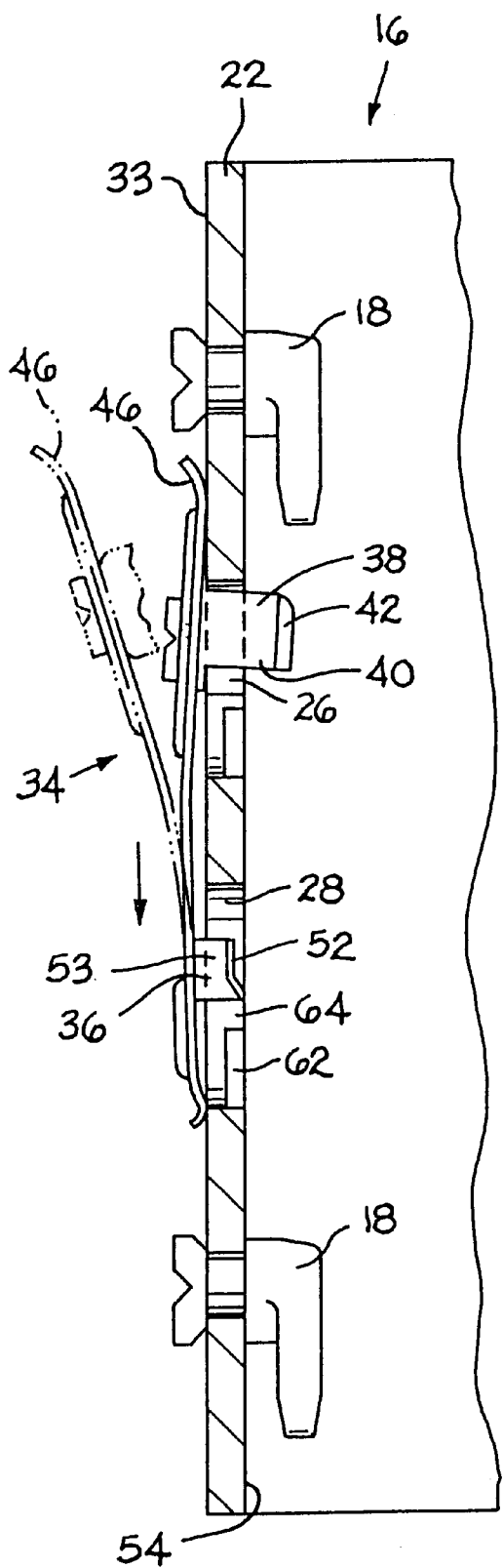
FIG. 14A is the same view as FIG. 14, but showing the locking member of FIG. 6 being mounted onto the bracket.
Figure 15:
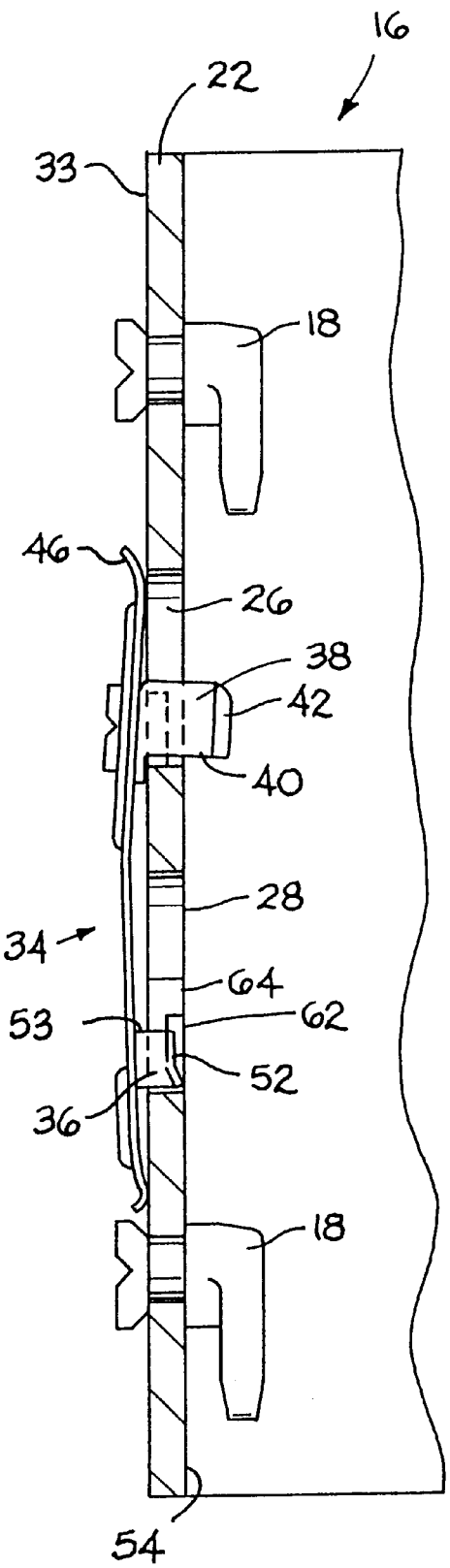
FIG. 15 is the same view as FIG. 14A, but with the locking member completely assembled onto the bracket.

FIGS. 14A and 15 show how the locking member 34 is mounted onto the bracket 16. First, the locking member 34 is brought adjacent to the outer surface 33 of the first leg 22 of the bracket 16, and the head 42 of the locking pin 38 is extended through the greater width portion 56 of the first hole 26 while the wings 52 of the clip 36 are extended through the greater width portion 56 of the second hole 28. Then, the clip 36 is flexed inwardly, and the resilient locking member 34 is moved downwardly with the wings 52 of the clip moving along the interior surface 54 of the bracket until they pass the non-recessed portion 64 and snap into the recess 62 in the second hole 28. At the same time, the shank 40 of the locking pin 38 is moving down into the narrow part 58 of the first hole 26. At this point, the locking member 34 is mounted on the bracket 16, as shown in FIG. 15. The wings 52 in the recess 62 prevent the locking member 34 from moving out of the second hole 28 unless the clip 36 is again flexed inwardly to permit the wings to get over the ridge 64, which cannot occur when the bracket 16 is mounted on the vertical member 12. When the clip 36 is installed on the bracket 16, it is recessed so that it does not project inside the flat inner surface 54 of the bracket 16.

Figure 4:
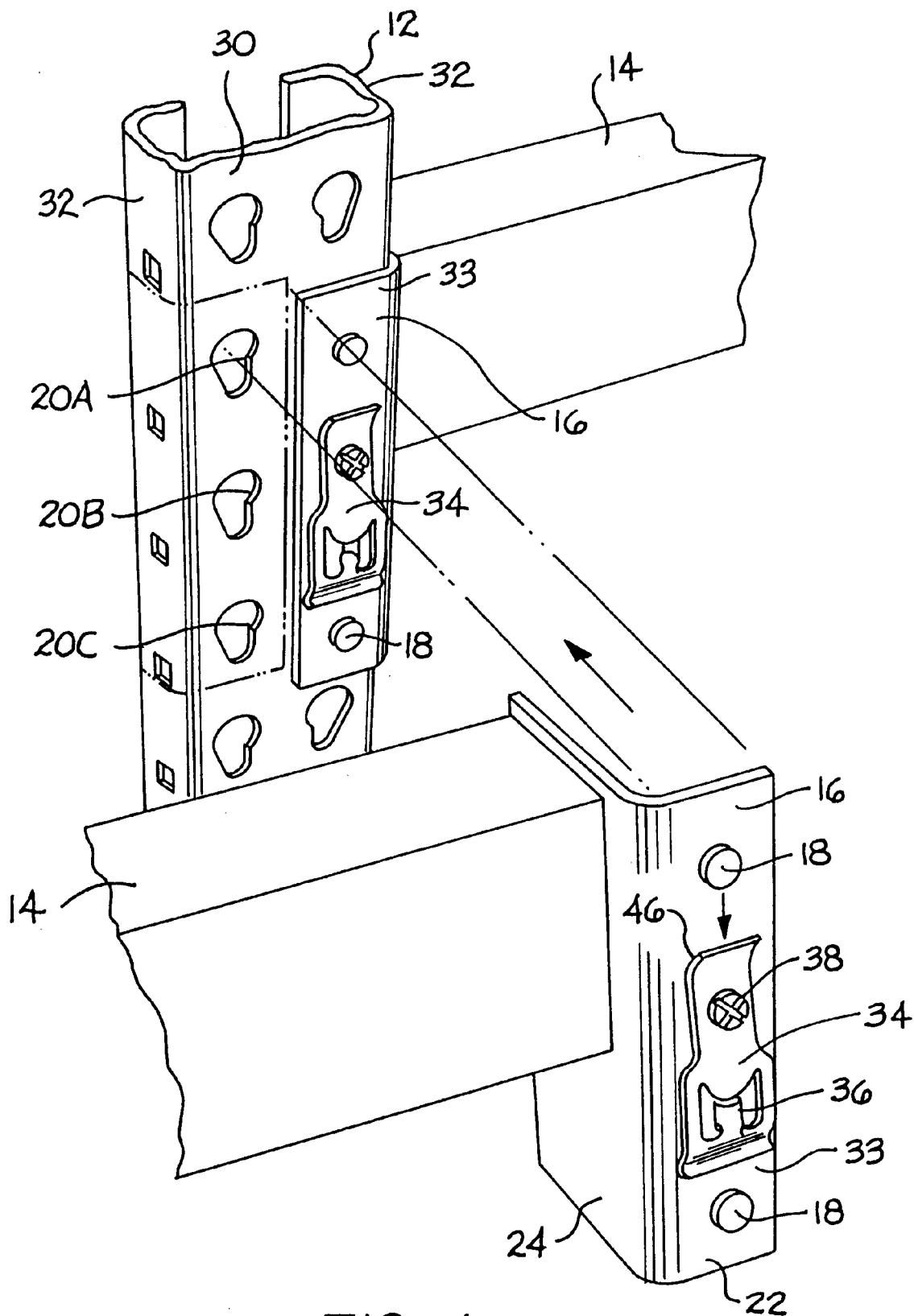
FIG. 4 is the same view as FIG. 3 but with the locking member mounted on the bracket of the horizontal beam.
Figure 5:
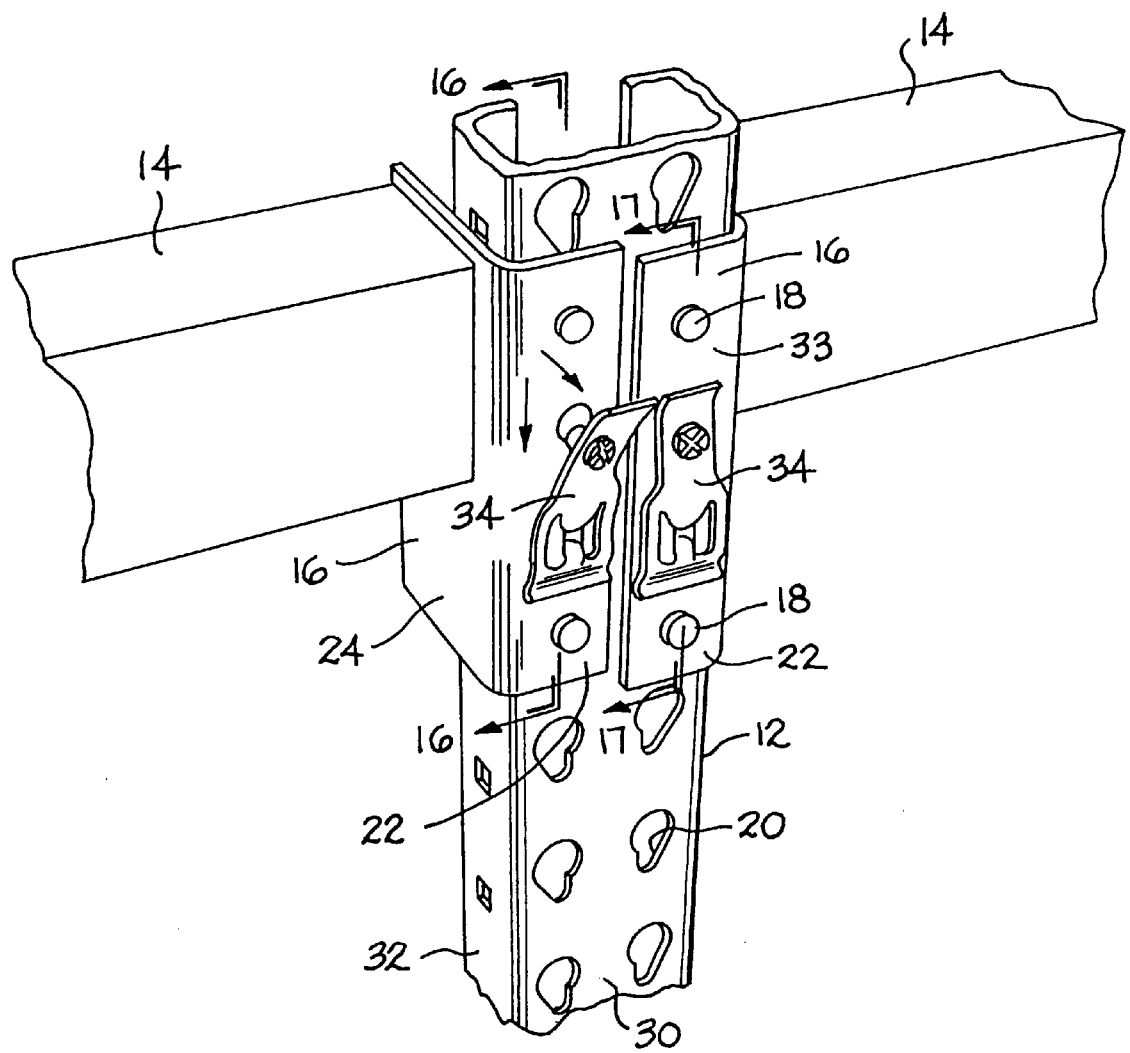
FIG. 5 is the same view as FIG. 4, but showing the horizontal beam being assembled onto the vertical member.
Figure 9:
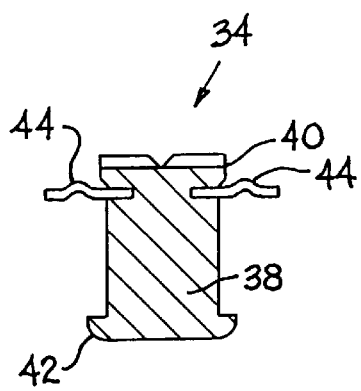
FIG. 9 is a view taken along the section 9—9 of FIG. 6.
Figure 8:
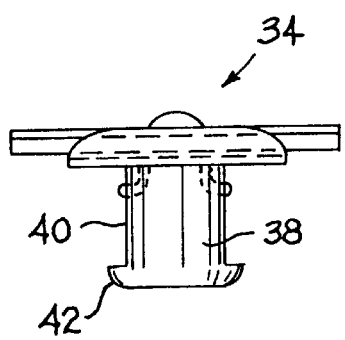
FIG. 8 is a top view of the locking member of FIG. 6.
Figure 7:
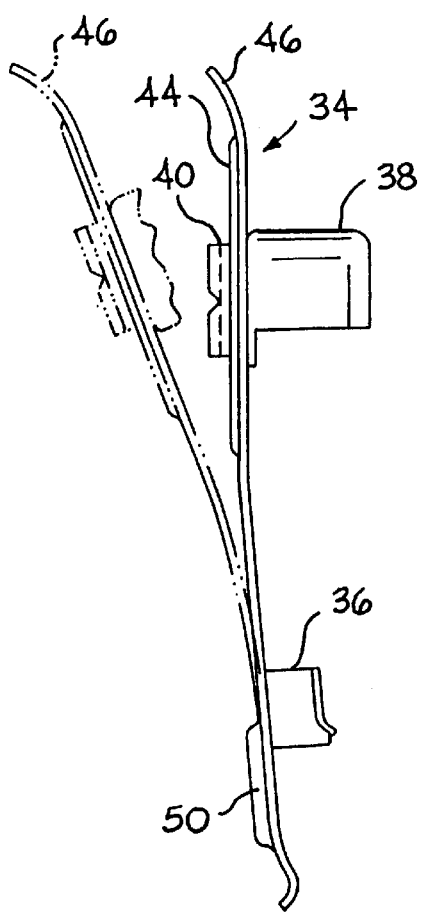
FIG. 7 is a side view of the locking member of FIG. 6.
Figure 6:
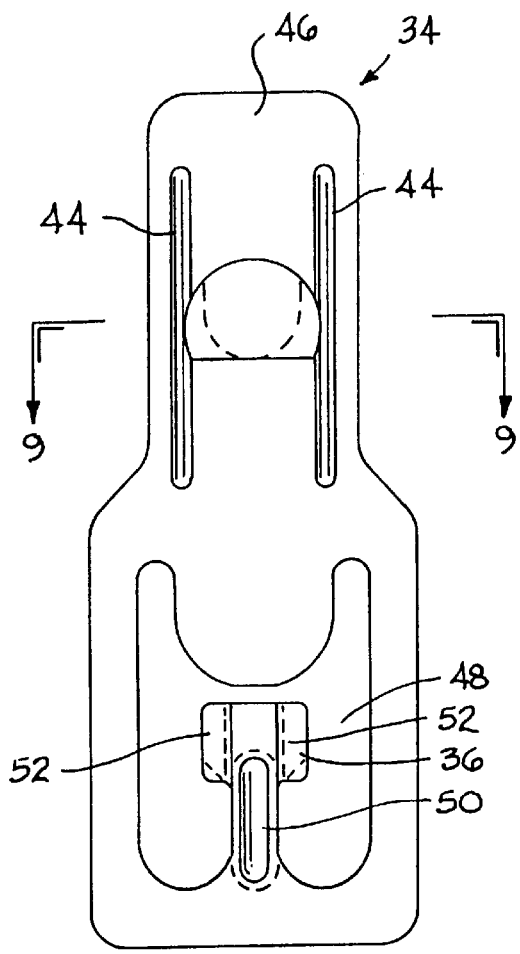
FIG. 6 is a front view of the locking member of FIGS. 1–5.
Figure 16:
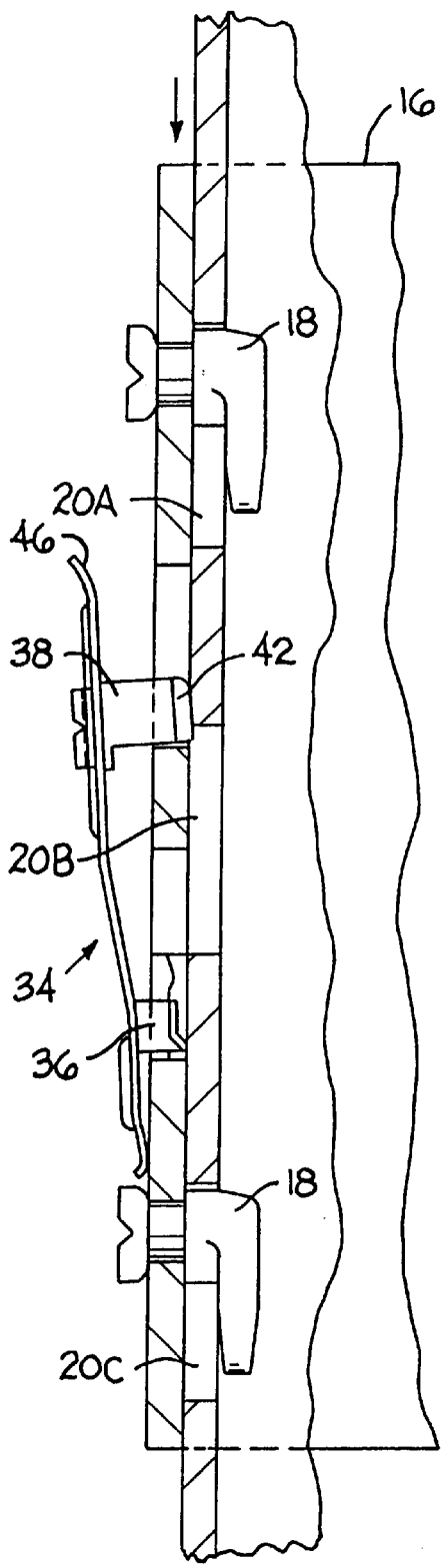
FIG. 16 is a view taken along the section 16—16 of FIG. 5.
Figure 17:
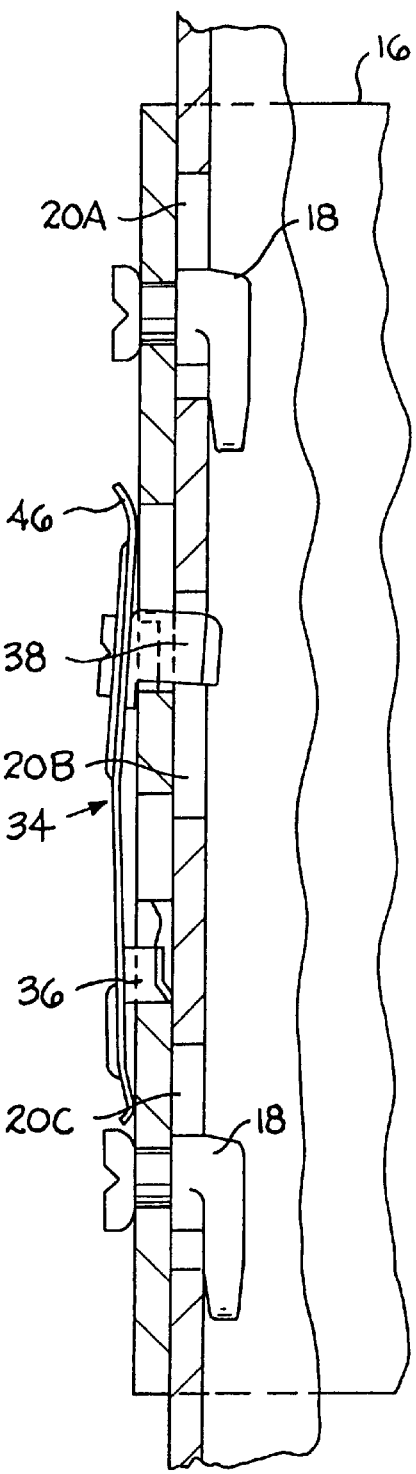
FIG. 17 is a view taken along the section 17—17 of FIG. 5.
Figure 21:
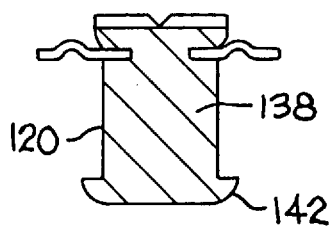
FIG. 21 is a view taken along the section 21—21 of FIG. 18.
Figure 20:
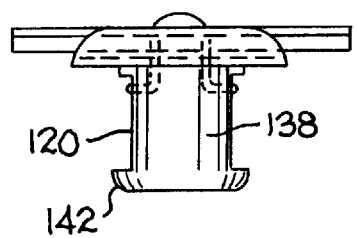
FIG. 20 is a top view of the locking member of FIG. 20.
Figure 19:
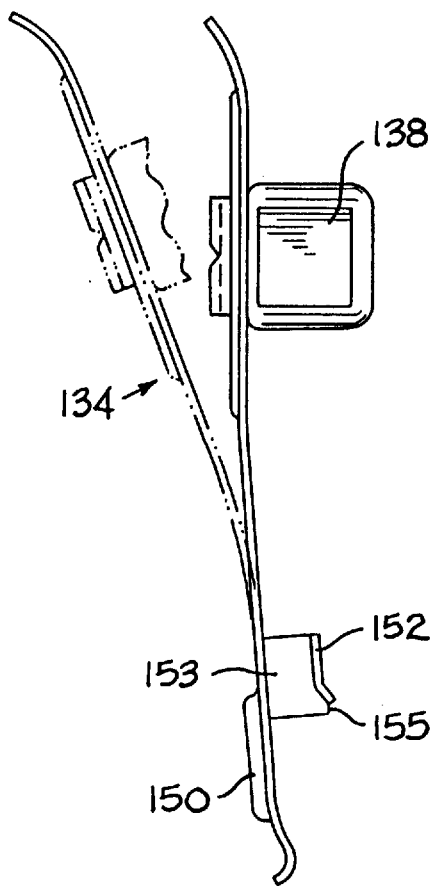
FIG. 19 is a side view of the locking member of FIG. 18.
Figure 18:
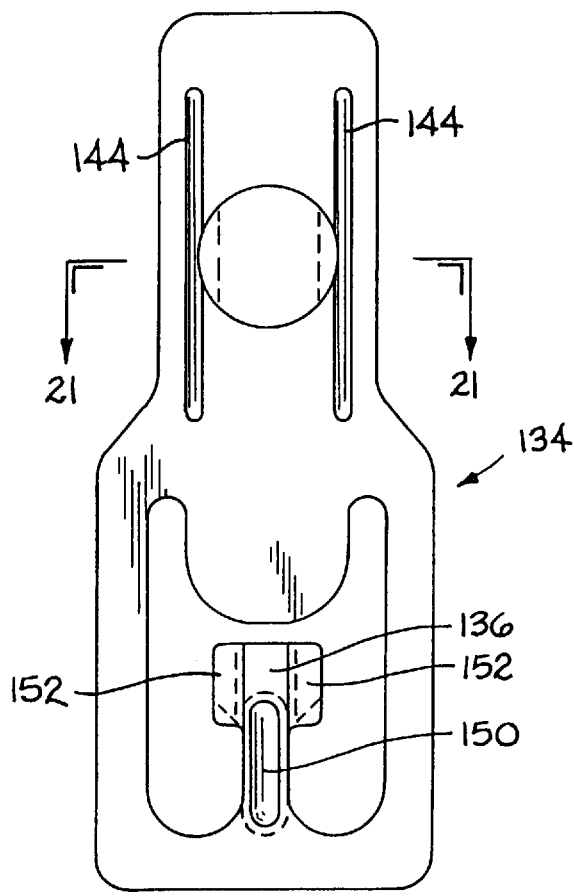
FIG. 18 is a front view of a second embodiment of a locking member made in accordance with the present invention.
Figures 26, 27:
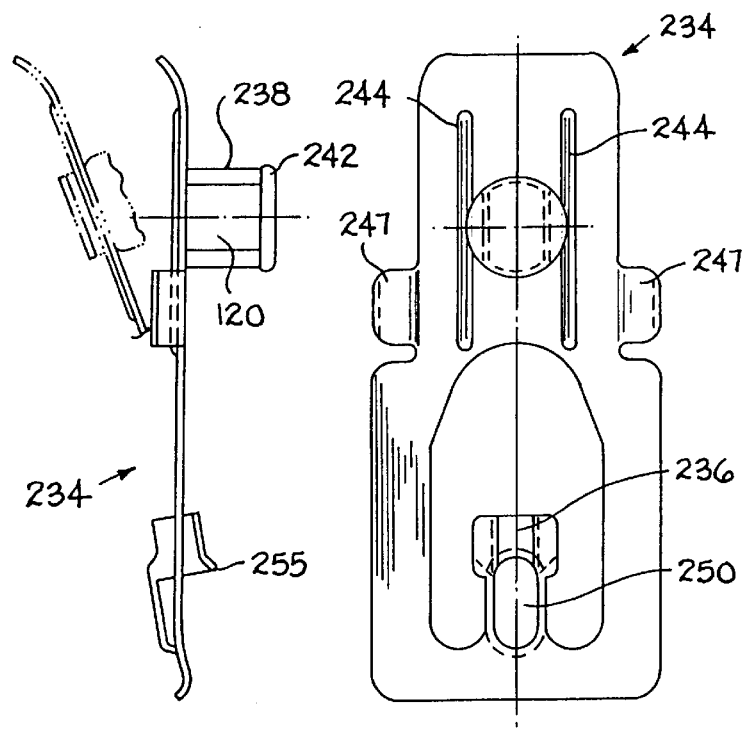
FIG. 26 is a front view of a third embodiment of a locking member made in accordance with the present invention.
FIG. 27 is a side view of the locking member of FIG. 26.
Figures 28, 29, 30:
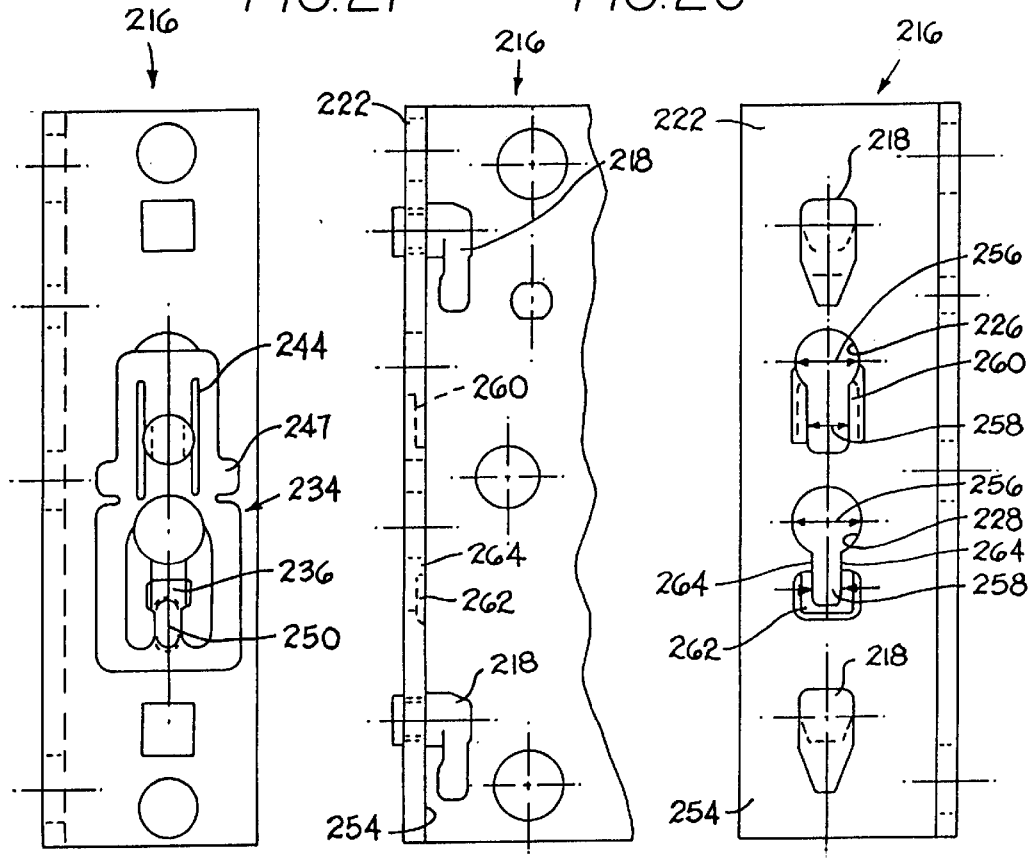
FIG. 28 shows the locking member of FIG. 26 mounted on a bracket.
FIG. 29 is an end view of the bracket of FIG. 28.
FIG. 30 is a side view of the bracket of FIG. 29.
Figures 31, 32:
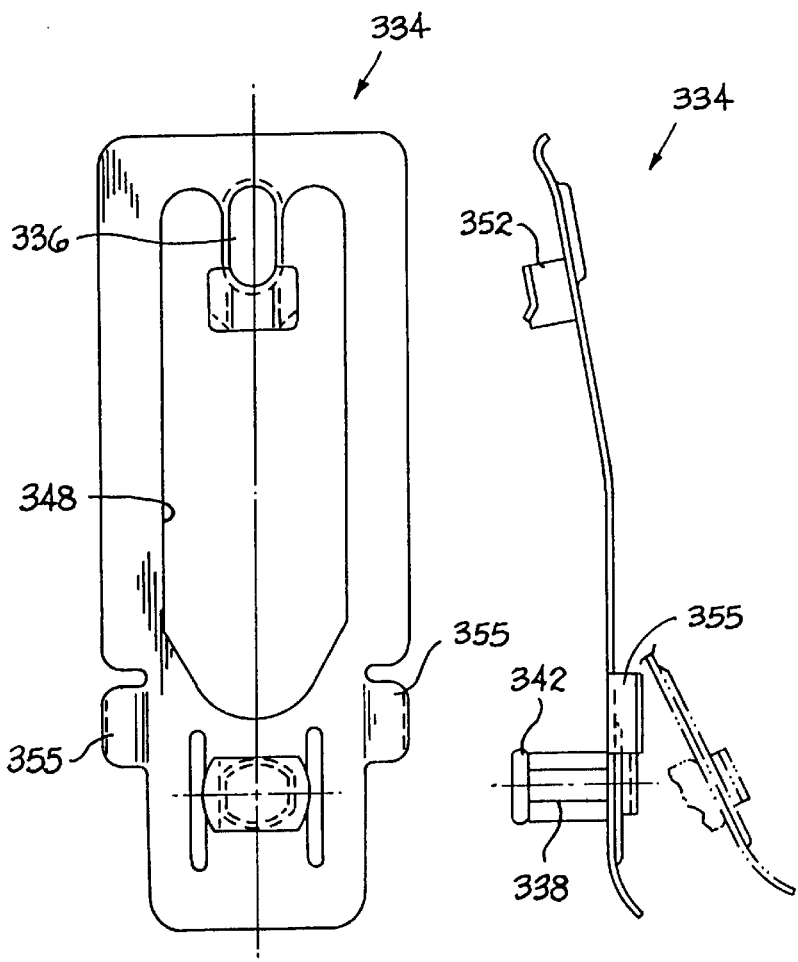
FIG. 31 is a front view of a fourth embodiment of a locking member made in accordance with the present invention.
FIG. 32 is a side view of the locking member of FIG. 31.
Figures 33, 34, 35:
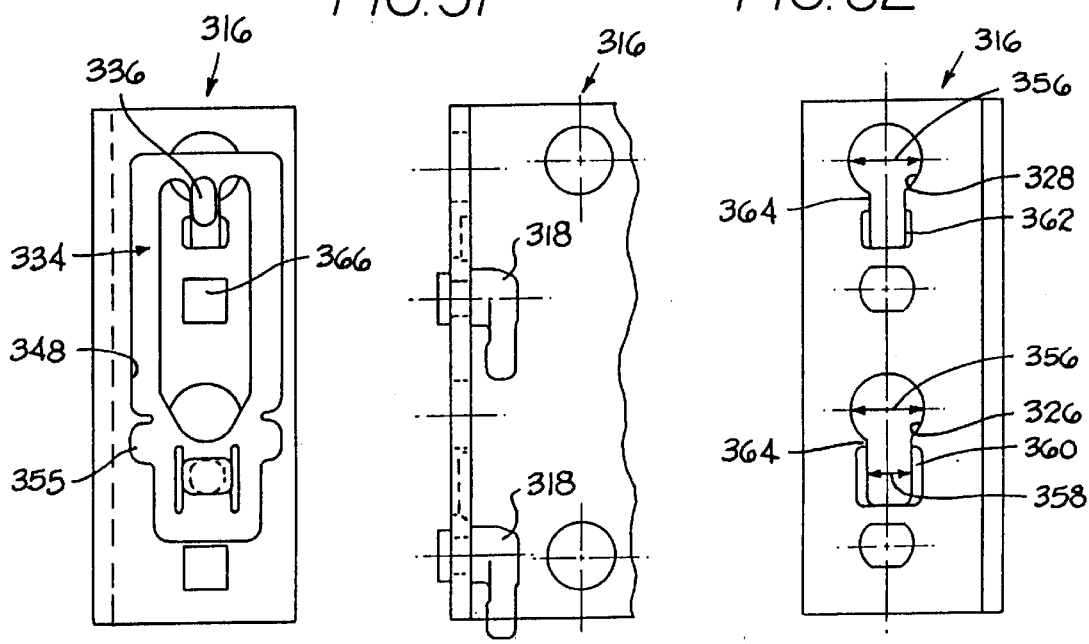
FIG. 33 shows the locking member of FIG. 31 mounted on a bracket.
FIG. 34 is an end view of the bracket of FIG. 33.
FIG. 35 is a side view of the bracket of FIG. 34.
Figures 36, 37:
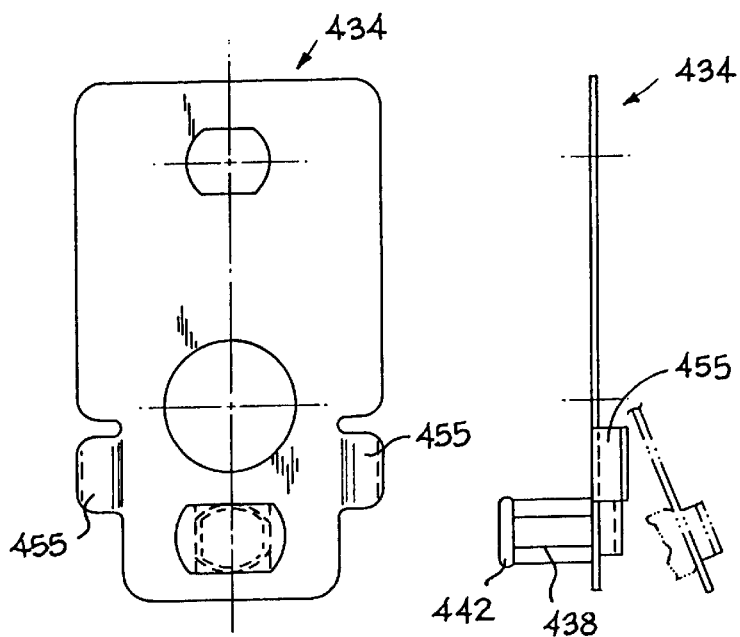
FIG. 36 is a front view of a fifth embodiment of a locking member made in accordance with the present invention.
FIG. 37 is a side view of the locking member of FIG. 36.
Figures 38, 39, 40:
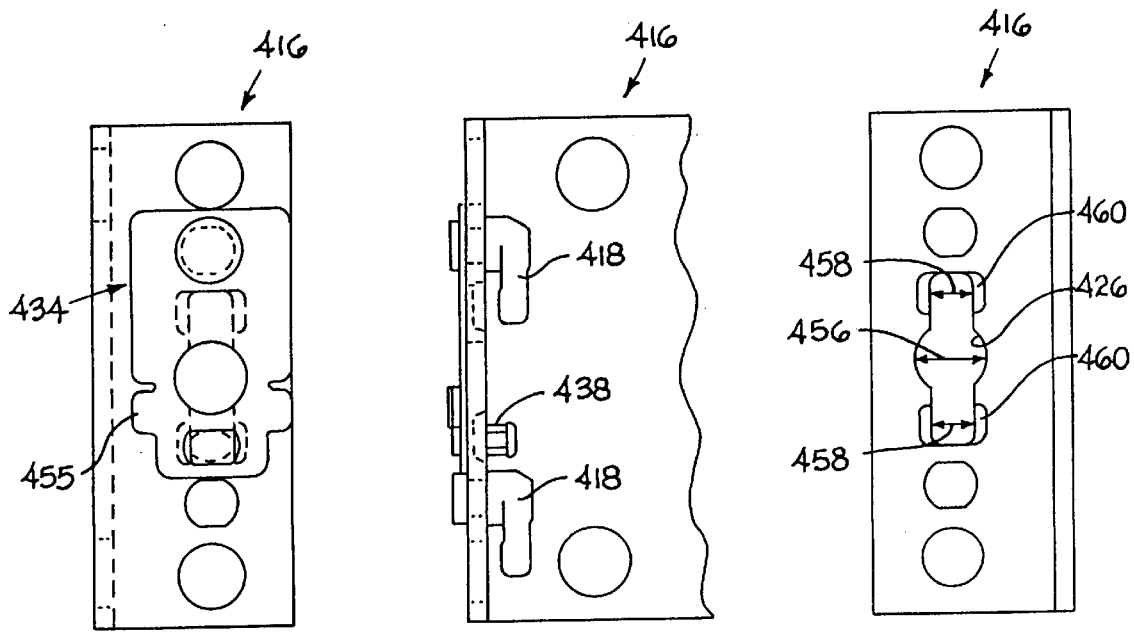
FIG. 38 is a view of the locking member of FIG. 36 mounted on a bracket.
FIG. 39 is an end view of the bracket and locking member of FIG. 38.
FIG. 40 is a side view of the bracket of FIG. 39.

Now, the assembled beam 14 is mounted onto the vertical member 12, moving in the direction shown in FIG. 4, toward the vertical member 12 and then downwardly along the vertical member, as shown in FIG. 16. The studs 18 enter their respective vertical member holes 20A and 20C. The locking pin 38 is pushed outwardly by the body of the vertical member, and the bracket 16 is moved downwardly until the locking pin 38 reaches the vertical member hole 20B. The resilience of the locking member body then pushes the locking pin 38 inwardly into the hole 20B. This then locks the beam 14 onto the vertical member 12. The locking pin 38 is located so that it is near the top of its respective hole 20B when the studs 18 are near the bottom of their respective holes 20A, 20C. The locking pin 38 thus prevents the beam 14 from moving upwardly a sufficient distance to permit the studs to be removed from the vertical member 12. When the bracket 16 is mounted on the vertical member 12, the body of the vertical member 12 prevents the clip 36 from flexing inwardly, so the resilient locking member 34 cannot become dislodged from the bracket 16 without first removing the beam 14 from the vertical member 12.

In order to remove the beam 14 from the vertical member 12, a person has to pull outwardly on the handle 46 of the resilient locking member 34, retracting the locking pin 38 to a position in which it is flush with the flat inner surface 54 of the bracket, so the locking pin 38 is removed from the hole 20B. The recess 60 in the narrow part 58 of the first hole 26 stops the head 42 of the locking pin 38 from coming completely out of the bracket 16, thereby preventing the operator from retracting the locking member 34 far enough to damage it. Then, the bracket 16 can be lifted up to a point at which the studs 18 can be removed from the holes 20A, 20C in the vertical member to remove the beam 14 from the vertical member 12.

FIGS. 18–21 show a second embodiment of a resilient locking member 134. This locking member 134 is very similar to the member of the first embodiment, except that the enlarged head portion 142 of the locking pin 138 is formed by making two cuts along the pin 138. This design also includes stiffening ridges 144, 150, a clip 136 with a stem 153 and wings 152. It should be noted that the lowermost portion 155 of the wings 152 is flared forwardly to help ramp the wings 152 over the non-recessed portion 64 to install the locking member 134 onto the bracket 116. The bracket 116, shown in FIGS. 22–25, is very similar to the first bracket 16, with studs 118, a first hole 126, a second hole 128, greater-width portions 156 and narrower-width portions 158 of the holes 126 and 128, and non-recessed, narrower-width portions 164. The locking member 134 is assembled onto its bracket 116 in the same manner as the first embodiment.

FIGS. 26–30 show a third embodiment. Again, the locking pin 238 of the locking member 234 has a slightly different shape, with a shank 120 and a wide head 242. In this embodiment, there are additional handles 247 on the sides of the resilient body. There still are ridges 244, 250 for strength, and the clip 236 has wings which are flared inwardly at the bottom 255. The bracket 216 includes studs 218 and first and second holes 226, 228 in its first leg 222. The first hole 226 receives the locking pin 238 and has a wide upper portion 256 and a narrower lower portion 258. The second hole 228 receives the clip 236 and has a wide upper portion 256 and a narrower lower portion 258. The interior surface 254 of the bracket 216 defines a recess 260 adjacent the narrow lower portion 258 of the first hole 226 which does not terminate before it reaches the wide part 256 of the hole. The recess 262 formed adjacent to the narrow part 258 of the second hole 228 does terminate short of the wide portion 256 of the hole, leaving a non-recessed, narrow width portion 264 for retaining the clip, as was explained with respect to the first embodiment.

FIGS. 31–35 show a fourth embodiment of the invention. In this case, the resilient locking member 334 is installed with the clip 336 above the locking pin 338. The first, pin-receiving hole 326 in the bracket 316 is then below the second, clip-receiving hole 328. The holes 326, 328 have enlarged portions 356 and narrow portions 358 and recesses 360, 362, and non-recessed, narrow width portions 364 as described with respect to the previous embodiments. The locking member 334 is installed downwardly on the bracket 316 as in the previous embodiments. The handles 355 are located in the lower portion of the locking member 334 to help retract the locking pin 338. In this embodiment, and in some others, the cut-out 348 aligns with an opening 366 in the bracket. This permits the operator to insert a drift pin through the locking member 334 into the opening 366 and to pry the bracket 316 upwardly with the drift pin while holding the locking member 334 in a retracted position to help dislodge the bracket 316 from its respective vertical member 12.

FIGS. 36–40 show a fifth embodiment. In this embodiment, there is no clip 436 on the locking member 434. Instead, the locking member 434 is staked to the bracket 416 by means of the upper stud 418. The locking pin 438 functions in the same manner as the previous embodiments, being retracted into a recess 460 in the narrow portion of the first hole 426. In this case, the hole 426 has upper and lower narrow portions and upper and lower recesses 460, which permits the same bracket piece to be used for left and right ends of the beam 14. It is possible to provide a second hole (not shown) in the bracket 416 even when the locking member 434 is staked so that, if the locking member 434 becomes damaged for any reason, it can be cut off and replaced in the field with a clip-type locking member as in the previous embodiments.

FIGS. 41–45 show a sixth embodiment of the invention. In this case, the resilient locking member 534 includes a lower clip 536 and an upper locking pin 538. The holes 526, 528 have enlarged portions 556 and narrower portions 558 and recesses 560, 562, and the lower hole 528 has a non-recessed, narrow width portion 564. The studs 518 are the same as in previous embodiments. What is different in this embodiment is that there are two outwardly-projecting ears 580 in the bracket 516, adjacent to the bottom of the lower hole 528. Once the locking clip member 534 is installed on the bracket 516, these ears 580 catch in an opening 582 of the clip, making it impossible to remove the clip 534 simply by pressing in on the clip 536 and lifting up. Instead, a screwdriver or other tool must be used to lift the bottom of the clip body 534 over the ears 580. The ears 580 are formed by displacing some of the material of the bracket 516 outwardly.

FIGS. 46–50 show a seventh embodiment of the invention, which is similar to the embodiment of FIGS. 31–35. This embodiment differs in that its upper hole 628 has an open top, so it is actually a slot. The holes 626, 628 have enlarged portions 656 and narrow portions 658 and recesses 660, 662, and non-recessed, narrow width portions 664. It would, however, be possible for the narrow portion 658 of the top hole 628 to have no enlarged portion 656 and to simply extend straight up. The studs 618 and handles 655 are as in previous embodiments.

It will be obvious to those skilled in the art that modifications may be made to the embodiments described above without departing from the scope of the present invention.

What is claimed is:

1. A locking member for a rack, comprising:
 a mounting bracket, having a first leg defining a substantially flat interior surface and an exterior surface and a plurality of mounting studs projecting inwardly from said interior surface, said first leg also defining at least a first through hole;
 a resilient member mounted on said first leg, lying adjacent to said exterior surface, and including a locking pin having a shank extending through said first hole, wherein said locking pin defines an enlarged head portion and said interior surface defines a recess adjacent to said first hole which receives said enlarged head portion.

2. A locking member for a rack as recited in claim 1, wherein said recess is deep enough to permit said locking pin to be substantially flush with said interior surface when said resilient member is retracted.

3. A locking member for a rack as recited in claim 2, wherein said first hole includes an enlarged-width portion large enough to permit the head of said locking pin to pass through and a narrower width portion large enough to permit the shank to pass through but too narrow to permit said enlarged head to pass through, and wherein said recess lies adjacent to said narrower width portion.

4. A locking member for a rack as recited in claim 2, wherein said resilient member is staked to said first leg at an end distant from said locking pin.

5. A locking member for a rack as recited in claim 2, wherein said first leg also defines a second hole, and wherein both said first and second holes define an enlarged width portion and a reduced width portion, and wherein said interior surface defines recesses adjacent to the reduced-width portion of each of said holes, at least the recess at the second hole terminating short of its respective enlarged width portion.

6. A locking member for a rack as recited in claim 3, wherein said first leg also defines a second hole, and wherein both said first and second holes define an enlarged width portion and a reduced width portion, and wherein said interior surface defines recesses adjacent to the reduced-width portion of each of said holes, at least the recess at the second hole terminating short of its respective enlarged width portion.

7. A locking member for a rack as recited in claim 5, wherein said resilient member includes a clip having left and right wings mounted in the recess of said second hole.

8. A locking member for a rack as recited in claim 2, and further comprising a hole in said resilient member aligned with a hole in said first leg.

9. A mounting bracket for mounting a horizontal beam of a rack on a vertical member of a rack, comprising:

an L-shaped member, having a substantially flat interior surface and an exterior surface and defining first and second legs, said first leg having two lugs projecting inwardly from its interior surface and defining first and second holes, said second hole having a narrow width portion, and wherein said interior surface defines a recess adjacent to said narrow width portion, leaving a non-recessed narrow portion.

10. A mounting bracket as recited in claim 9, and further comprising a resilient member mounted on said first leg, said resilient member including a clip extending through said second hole and retained in said recess.

11. A mounting bracket as recited in claim 10, wherein said resilient member further includes a locking pin which extends through said first hole.

12. A mounting bracket as recited in claim 11, wherein said locking pin has a shank and an enlarged head and said first hole defines an enlarged width portion large enough to permit the enlarged head to pass through and a narrower width portion, which is wide enough to permit the shank to pass through but not wide enough to permit the enlarged head to pass through.

13. A mounting bracket as recited in claim 12, wherein said interior surface also defines a recess adjacent to the narrower width portion of said first hole, in order to permit the enlarged head to be retracted to a position substantially flush with said interior surface.

14. A mounting bracket as recited in claim 9, wherein said bracket further defines at least one outwardly-projecting ear.

15. A rack, including:

a plurality of vertical members defining a plurality of vertical member holes, and a plurality of horizontal beams supported on said vertical members;

a mounting bracket at the end of one of said horizontal beams, including an L-shaped member, having a substantially flat interior surface and an exterior surface and defining first and second legs, said first leg having at least two lugs projecting inwardly from its interior surface, said two lugs being received in two of said vertical member holes; wherein said first leg defines first and second holes, at least said first hole being aligned with one of said vertical member holes, each of said first and second holes having an enlarged width portion and a narrower width portion, wherein said interior surface defines a recess adjacent to each of said narrower width portions, and the recess adjacent to the narrower width portion of said second hole terminates short of its respective enlarged width portions; and a resilient locking member including a clip mounted in the recess of said second hole, with said vertical member preventing said clip from moving further inwardly, and including a locking pin having a shank and an enlarged head, wherein the shank extends through said first hole and through the vertical member hole aligned with said first hole.

\* \* \* \* \*